US011881078B2

(12) United States Patent
Coon et al.

(10) Patent No.: US 11,881,078 B2
(45) Date of Patent: Jan. 23, 2024

(54) GAMING SYSTEMS AND METHODS WITH EMOTIVE LIGHTING

(71) Applicant: LNW Gaming, Inc., Las Vegas, NV (US)

(72) Inventors: Robert Coon, Chicago, IL (US); Christian Kulujian, Chicago, IL (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 17/730,509

(22) Filed: Apr. 27, 2022

(65) Prior Publication Data

US 2022/0254221 A1 Aug. 11, 2022

Related U.S. Application Data

(63) Continuation of application No. 17/065,741, filed on Oct. 8, 2020, now Pat. No. 11,348,400.

(51) Int. Cl.
*G07F 17/32* (2006.01)
*G07F 17/34* (2006.01)

(52) U.S. Cl.
CPC ...... *G07F 17/3211* (2013.01); *G07F 17/3213* (2013.01); *G07F 17/34* (2013.01)

(58) Field of Classification Search
None
See application file for complete search history.

(56) References Cited

U.S. PATENT DOCUMENTS 7,682,249 B2 * 3/2010 Winans ............... G07F 17/3211 463/31
8,002,424 B2 * 8/2011 Hwang ................... G07F 17/32 362/125
8,235,813 B2 8/2012 Cornell et al.
8,376,839 B2 2/2013 Lesley et al.
8,777,757 B2 7/2014 Chudek
9,330,537 B2 5/2016 Detlefsen et al.
9,659,432 B2 5/2017 Castro et al.
9,922,963 B2 * 3/2018 Hung .................... H01L 33/502
10,096,202 B2 10/2018 Castro et al.
10,539,300 B2 * 1/2020 Kim ........................ F21V 13/08
10,775,549 B2 * 9/2020 Thompson .......... G07F 17/3211
2005/0261057 A1 11/2005 Bleich et al.
2011/0118034 A1 * 5/2011 Jaffe ................... G07F 17/3211 463/47
2014/0087887 A1 * 3/2014 Chudek ............... G07F 17/3202 463/46
2018/0330568 A1 11/2018 Glenn et al.
2019/0043304 A1 2/2019 Castro et al.
2019/0363227 A1 * 11/2019 Luo ......................... H01L 33/62
2020/0111295 A1 4/2020 Glenn et al.
2020/0233137 A1 * 7/2020 Thompson ........... G02B 6/0093

* cited by examiner

*Primary Examiner* — Ronald Laneau

(57) ABSTRACT

A presentation assembly for a gaming machine, the presentation assembly comprising a display device, at least one light-emitting device positioned adjacent the display device, and a reflective surface facing the at least one light-emitting device. The reflective surface includes at least one convex surface element extending towards the at least one light-emitting device. The convex surface elements are configured to reflect at least a portion of light emitted by the light-emitting devices towards a predetermined area associated with the gaming machine.

20 Claims, 10 Drawing Sheets

GAMING SYSTEMS AND METHODS WITH EMOTIVE LIGHTING

CROSS-REFERENCE TO RELATED APPLICATIONS

This patent application is a continuation of U.S. patent application Ser. No. 17/065,741, filed Oct. 8, 2020, the contents of which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2020, SG Gaming, Inc.

FIELD

The present disclosure relates generally to gaming systems, apparatus, and methods and, more particularly, to emotive lighting systems and assemblies for gaming.

BACKGROUND

The gaming industry incorporates various presentation elements to facilitate and/or enhance gaming experiences in a gaming environment. For example, the gaming industry may incorporate audio, visual, and/or tactile presentation elements into a gaming machine to present a game, indicate changes to the game state, and attract the attention of players and bystanders to the game. These presentation elements may include displays, speakers, player input devices, and/or lighting assemblies. The presentation elements may be operated independently or in combination with each other to present one or more different states of the gaming machine. As the gaming industry matures and gaming environments become further populated with more gaming machines and other devices including presentation elements, new and unique configurations of presentation elements are needed to attract interest to a gaming machine.

Moreover, additional constraints or limitations may affect presentation element configuration of a gaming machine. For example, the gaming machine may have limited physical space to incorporate presentation elements. In another example, the gaming machine may have functional requirements for the presentation elements, such as a lighting system that focuses emitted light towards an area relative to the gaming machine where the player is likely to be located. Accordingly, improvements to presentation elements and configurations thereof for gaming machines are needed.

SUMMARY

According to one aspect of the present disclosure, a presentation assembly comprises a display device, at least one light-emitting device positioned adjacent the display device, and a reflective surface facing the at least one light-emitting device. The reflective surface includes at least one convex surface element extending towards the at least one light-emitting device. The convex surface elements are configured to reflect at least a portion of light emitted by the light-emitting devices towards a predetermined area associated with a gaming machine. The presentation assembly may be incorporated into a single, freestanding gaming machine.

According to another aspect of the disclosure, a gaming machine comprises a cabinet, a display device coupled to the cabinet, a lighting assembly comprising at least one light-emitting device positioned adjacent the display device, and a reflective surface coupled to the cabinet and facing the light-emitting devices. The reflective surface includes at least one convex surface element extending towards the light-emitting devices. The convex surface elements are configured to reflect at least a portion of light emitted by the light-emitting devices towards a predetermined area associated with the gaming machine.

According to yet another aspect of the disclosure, an emotive lighting assembly for a gaming machine is provided, the emotive lighting assembly comprising at least one surface light-emitting device oriented to emit light towards a predetermined area associated with the gaming machine, at least one indirect light-emitting device positioned behind the surface light-emitting devices relative to the predetermined area, and a reflective surface oriented to face the indirect light-emitting devices. The reflective surface including at least one convex surface element extending towards the indirect light-emitting devices. The convex surface elements are configured to reflect at least a portion of light emitted by the indirect light-emitting devices towards the predetermined area.

Additional aspects of the invention will be apparent to those of ordinary skill in the art in view of the detailed description of various embodiments, which is made with reference to the drawings, a brief description of which is provided below.

Figure 1:
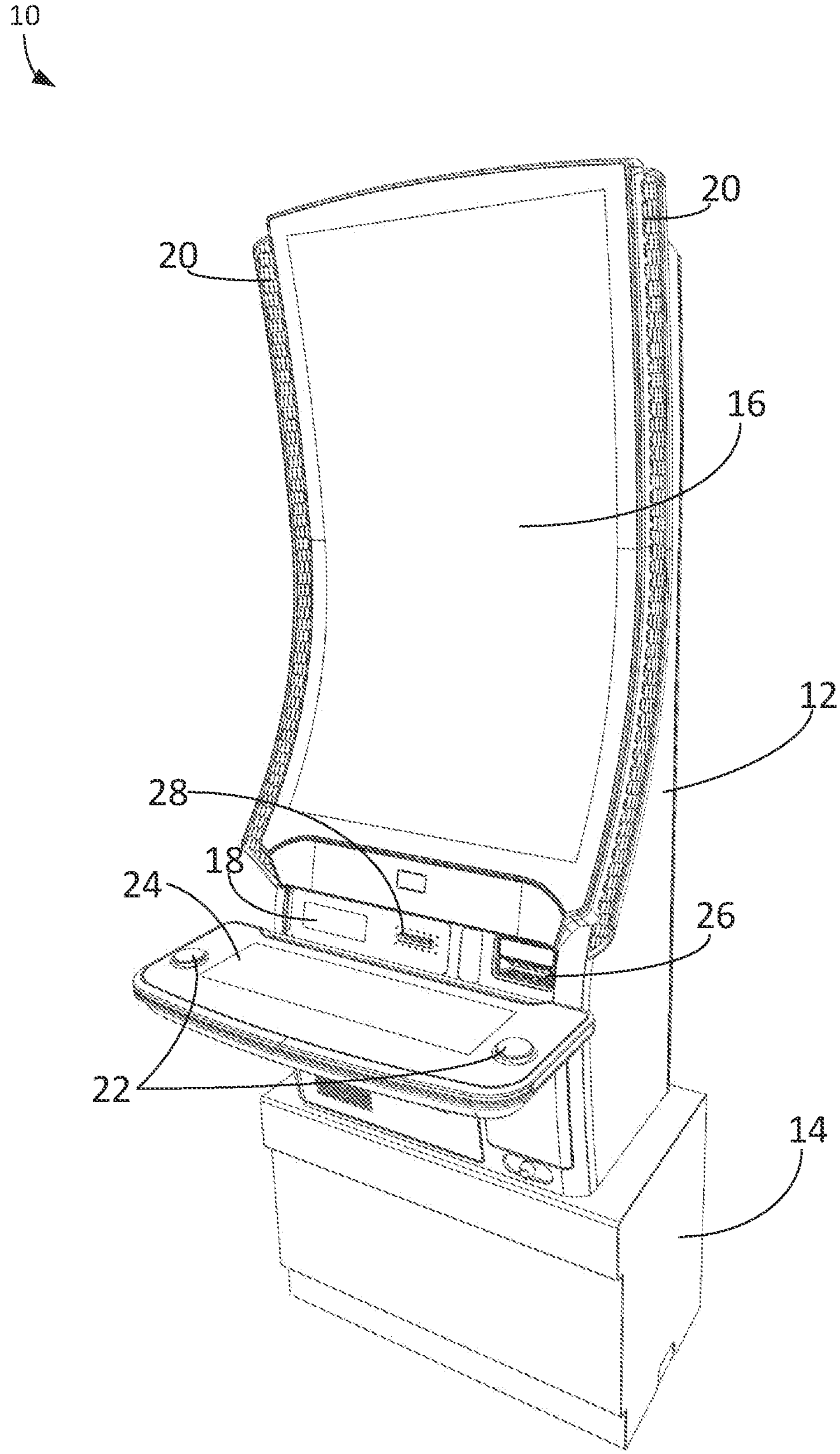
FIG. 1 is a perspective view of a free-standing gaming machine according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.), When provided in a social or casual game format, the wagering game may closely resemble a traditional casino game, or it may take another form that more closely resembles other types of social/casual games.

As used herein when describing light and light-emitting devices, it is to be understood that the use of "facing" or "orientation" of the light-emitting devices are not intended to limit light-emitting devices described herein to devices that emit light in a single direction. Rather, any suitable form of light-emitting device may be used provided at least a substantial portion of the emitted light can be directed to the "facing" direction to act as described herein, including devices that incorporate intermediate components like waveguides or opaque covers and devices that emit light in multiple directions. Although surface-mounted devices like light-emitting diodes may have a particular orientation for light emission, the orientation of other suitable light-emitting devices (e.g., a fluorescent bulb) may refer to the physical relationship between the light-emitting device and another component within the systems described herein. Moreover, at least some light-emitting devices described herein may be referred to as "surface light-emitting devices." It is to be understood that the use of the term "surface" does not limit the light-emitting devices to direct light sources visible on a surface, but rather light-emitting devices that, either directly or via an intermediate light guide like a diffuser, emit light visible on or near a predefined surface.

The systems and methods described herein include gaming machines with emotive lighting systems that facilitate indirect lighting, particularly toward one or more player areas (e.g., an area directly in front of the machine) associated with the gaming machine. Indirect lighting may be beneficial, for example, to enable complex and/or voluminous emotive lighting configurations within limited physical spaces without requiring the light-emitting devices to be in a particular orientation relative to the player area. In at least some embodiments, the systems and methods described herein include indirect light-emitting lights facing towards a reflective surface that at least partially defines a light channel. The reflective surface may include one or more convex surface elements that extend out from the reflective surface and towards the indirect light-emitting devices such that light emitted from the indirect light-emitting devices is reflected by the convex surface elements through the light channel and towards the player area. The use of convex surface elements in comparison to a flat surface or other surface configurations may facilitate an increased amount of emitted light traveling out through the light channel rather than reflecting within the light channel, thereby resulting in an increase in intensity of the light and/or increasing the field of view (FOV) of the emitted light. In certain embodiments, the reflective surface may include concave surface elements in addition to or in place of the convex surface elements. The concave surface elements may provide similar or different lighting effects to the effects resulting from the convex surface elements.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 is positioned on a stand 14 to bring the inputs and display of the gaming machine 10 to a predetermined height (e.g., a height for most players to interact with the gaming machine 10 either sitting or standing).

The input devices, output devices, and input/output devices are disposed on, and securely coupled to, the cabinet 12. By way of example, the output devices include a primary display 16, a secondary display 18, one or more emotive lighting assemblies 20 (described further herein), and one or more audio speakers. The primary display 16 may be a mechanical-reel display device, a video display device, or a combination thereof in which a transmissive video display is disposed in front of the mechanical-reel display to portray a video image superimposed upon the mechanical-reel display. The secondary display 18 may be a video display device that supplements that presentation of the primary display 16. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include additional, fewer, or alternative displays, including those described elsewhere herein. For example, the gaming machine 10 may include a touch screen 22 for presenting information to a player and accepting player input. In addition to the touch screen 22, the gaming machine 10 may include other input and output devices, such as touch screens mounted over the primary or secondary displays, buttons 24 on a button panel, a bill/ticket acceptor and dispenser 26, a card reader/writer 28, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 22, buttons 24, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation e.g., pressing a “Max Bet” button or soft key to indicate a player’s desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the “credits” meter 84 (see FIG. 3). The physical item may be, for example, currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 26, the card reader/writer 28, a wireless communication interface for reading cash or credit data from a nearby mobile device, and a network interface for withdrawing cash or credits from a remote account via an electronic funds transfer. In response to a cashout input that initiates a payout from the credit balance on the “credits” meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 28, the ticket dispenser 26 for printing tickets redeemable for cash or credits, a wireless communication interface for transmitting cash or credit data to a nearby mobile device, and a network interface for depositing cash or credits to a remote account via an electronic funds transfer.

Figure 2:
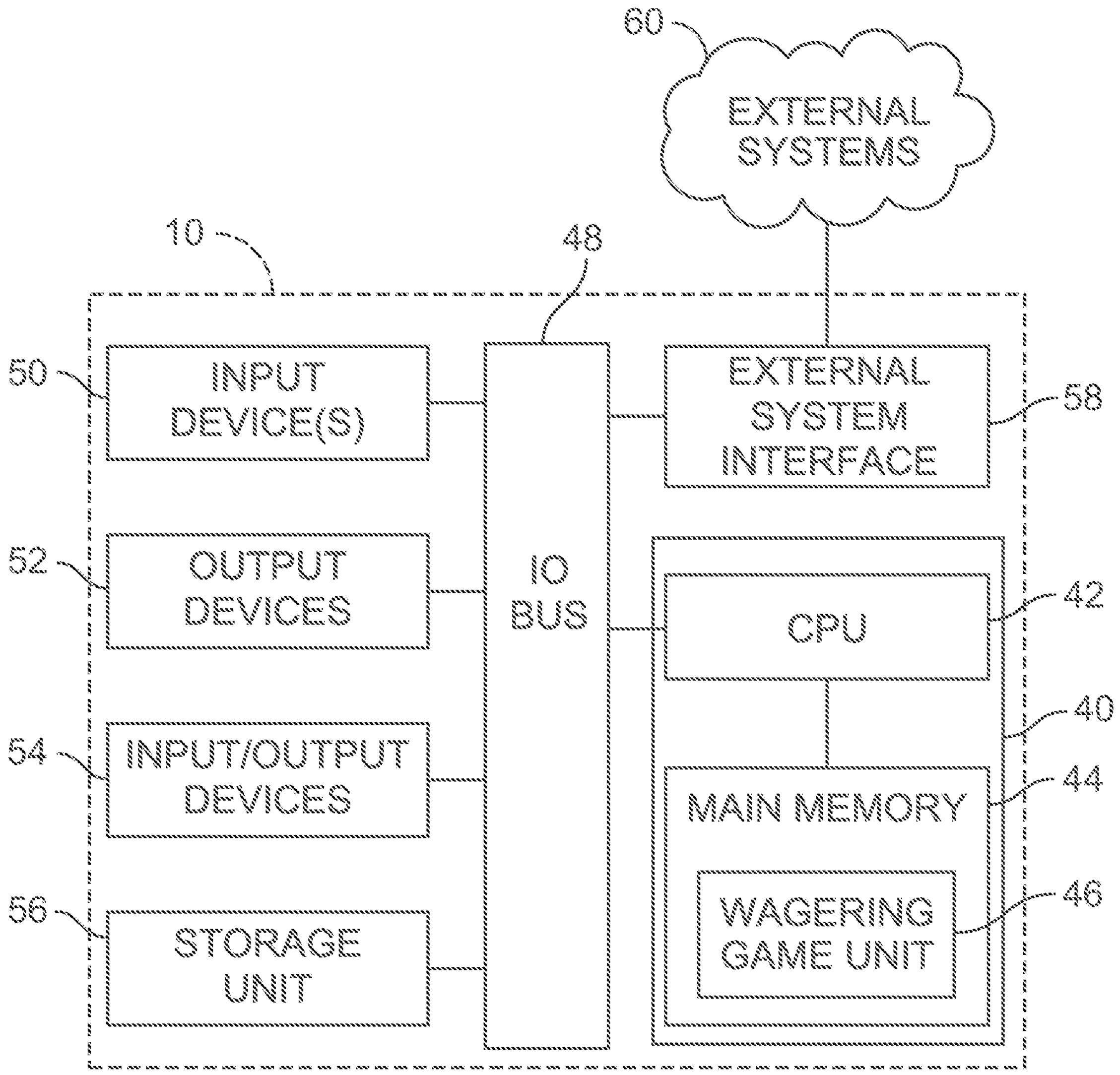
FIG. 2 is a schematic view of a gaming system according to one or more embodiments of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices, which need not be disposed proximal to one another and may be located in different devices or in different locations. The game-logic circuitry 40 is operable to execute all of the various gaming methods and other processes disclosed herein, such as emotive lighting administration. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52 (e.g., presentation and emotive lighting system and input/output devices 54 such as those discussed above in connection with FIG. 1). The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player’s portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry whether located within (“thick client”), external to (“thin client”), or distributed both within and external to (“intermediate client”) the gaming machine 10 is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory-contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RING or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
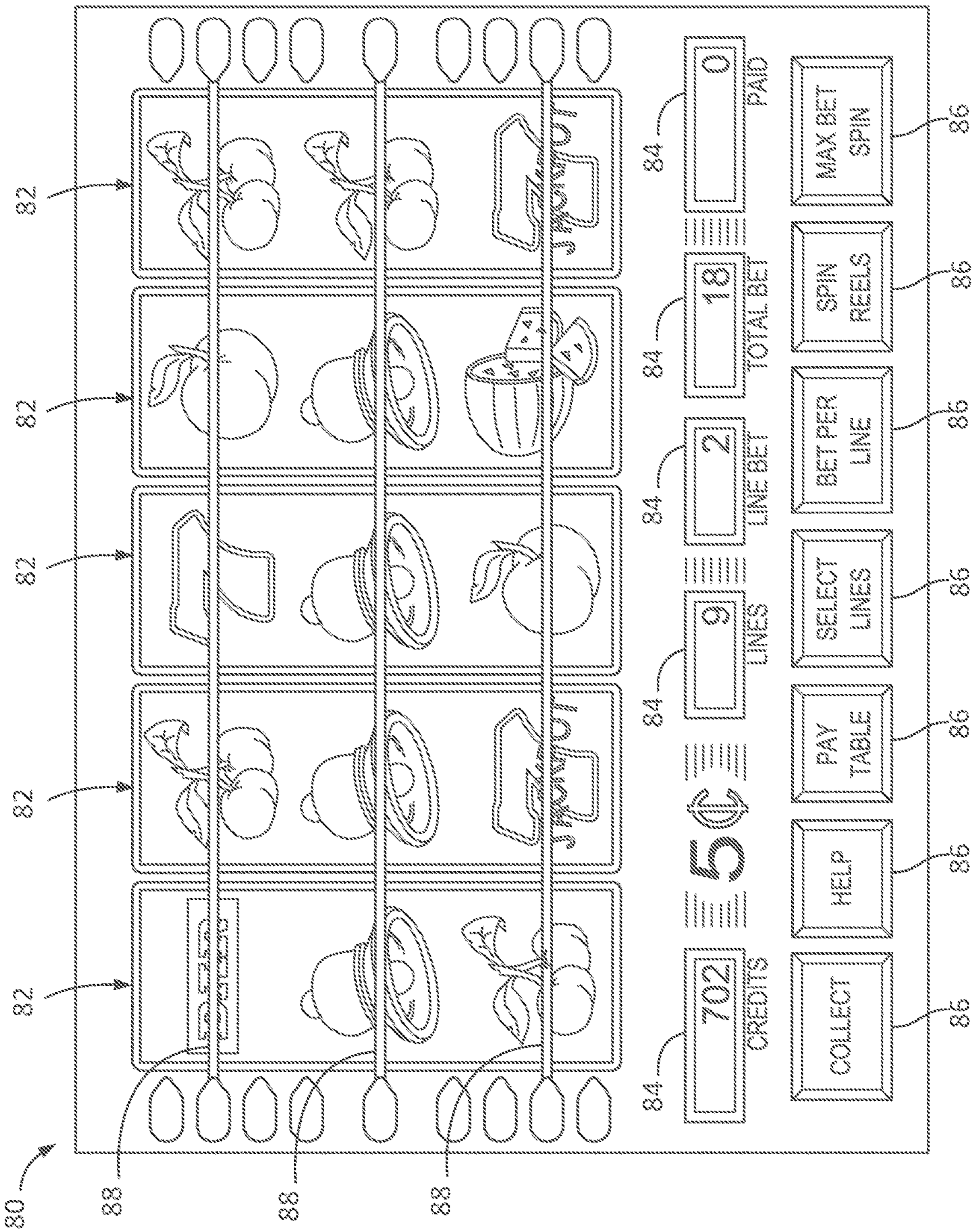
FIG. 3 is an image of an exemplary basic-game screen of a wagering game displayed on a gaming machine, according to one or more embodiments of the present disclosure.

Referring now to FIG. 3, there is illustrated an image of a basic-game screen 80 adapted to be displayed on the primary display 16. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 24 shown in FIG. 1. The game-logic circuitry 40 operates to execute a wagering-game program causing the primary display 18 or the secondary display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 16, other display device, or other output device (e.g., speakers, lights, communication device, etc.) to change from a first state to at least a second state, wherein the second state of the primary display 16 comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission, Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada. Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

The gaming systems and methods described herein include emotive lighting systems that emit light in one or more emotive sequences. These emotive sequences may be used to convey different states, events, and/or other aspects of a gaming machine to a player and bystanders. For example, the emotive lighting may add to the theatrics or drama of the game presented by the gaming machine to enhance the player experience. The emotive lighting may be synchronized, for example, to elements presented by a display device and/or audio from one or more speakers. The emotive lighting may also be operated independent of other presentation elements of the gaming machine. In at least some embodiments, the emotive lighting may be focused towards one or more areas relative to the gaming machine, such as an area in front of the gaming machine to attract players and passersby. To focus the emotive lighting, the gaming machines may include direct lighting (i.e., light emitted towards the area), indirect lighting via reflectors, waveguides, etc., and/or combinations thereof. Indirect lighting may be used, for example, to provide different lighting sequences comparative to direct lighting and/or to add additional lighting to a gaming machine within physical limitations of the machine. The presentation on the display device, the various forms of lighting from the emotive lighting systems, and the tactile and/or audio response of the gaming machine may work in concert to create a cascading, multi-layered gaming experience. The timing and the rhythm of these elements (particular in combination with each other) may add to the excitement of gameplay.

Figure 4:
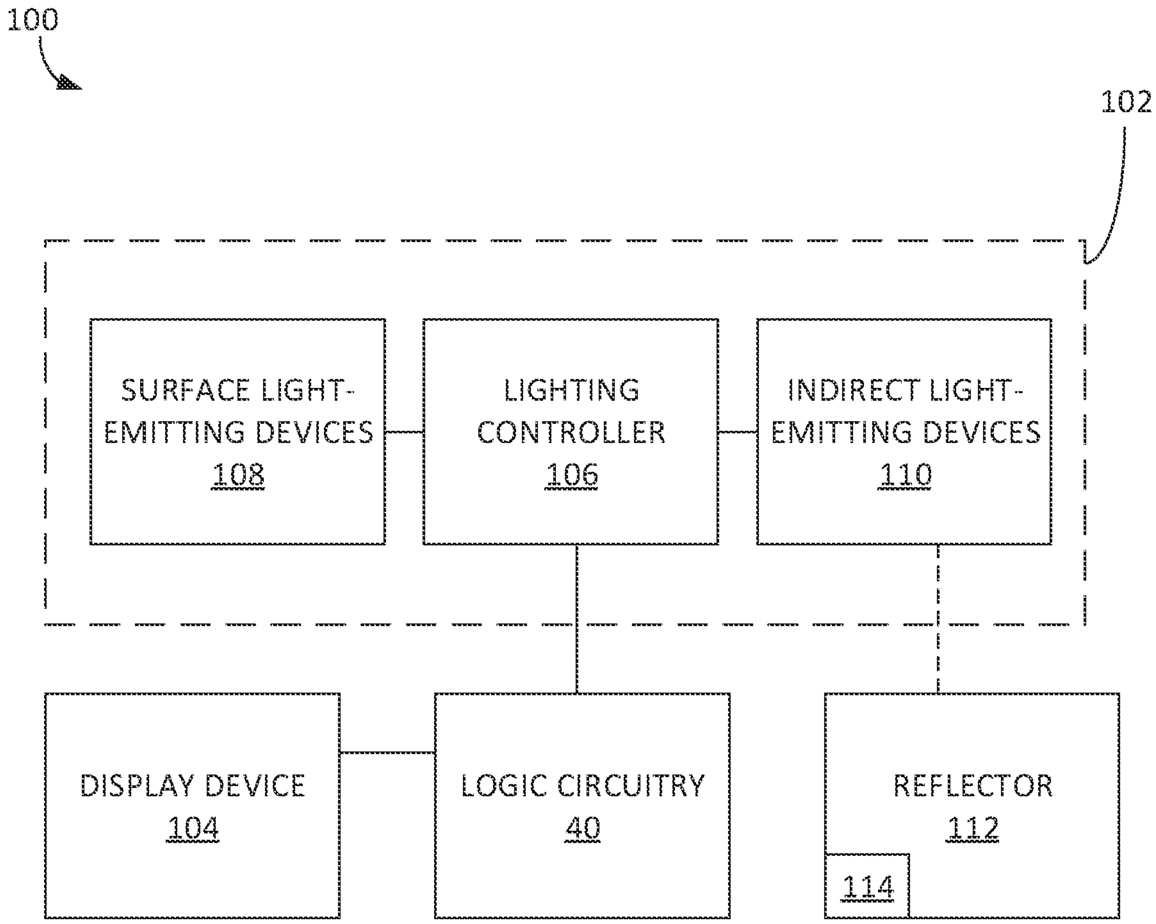
FIG. 4 is a block diagram of an example presentation assembly for a gaming machine, according to one or more embodiments of the present disclosure.

Referring now to FIG. 4, a block diagram of an example presentation assembly 100 for a gaming machine is shown. The presentation assembly 100 is configured to present various information, attractions, and/or features to players and bystanders. The components of the presentation assembly 100 may be mechanically, electrically, and/or communicatively coupled together to form the assembly 100. At least a portion of the presentation assembly 100 may be in communication with the logic circuitry 40 (shown in FIG. 2). In certain embodiments, a gaming machine may include a plurality of presentation assemblies. For example, a gaming machine may include a presentation assembly focused around one or more display devices and a second presentation assembly focused around an input deck. In the example embodiment, the presentation assembly 100 includes an emotive lighting assembly 102 and a display device 104. In other embodiments, the presentation assembly 100 may include additional, fewer, or alternative elements, including those described elsewhere herein. For example, the presentation assembly 100 may include audio output devices, tactile output devices vibration motors), additional display devices, and/or additional lighting assemblies.

The emotive lighting assembly 102 is configured to output or emit light according to one or more emotive lighting sequences. The emotive lighting assembly 102 includes a lighting controller 106, one or more surface light-emitting devices 108, and one or more indirect light-emitting devices 110. In other embodiments, the emotive lighting assembly 102 may include additional, fewer, or alternative components. For example, in certain embodiments, the emotive lighting assembly 102 may not include the surface light-emitting devices 108.

The lighting controller 106 is electrically and/or communicatively coupled to the light-emitting devices 108, 110 to control the output of light from the emotive lighting assembly 102. For example, the lighting controller 106 may regulate the power transmitted to the light-emitting devices 108, 110 such that the power delivered to the light-emitting devices 108, 110 affects the color, intensity, and/or other light characteristics of the emitted light (including the absence of emitted light by selectively providing no power to the light-emitting devices 108, 110). In another example, the lighting controller 106 transmits data-based commands to the light-emitting devices 108, 110 or an intermediate device to control the emitted light.

In the example embodiment, the lighting controller 106 is a separate device in data communication with the logic circuitry 40 to transmit information relating to the lighting assembly 102 and receive commands to control the lighting assembly 102. For example, the logic circuitry 40 may control the emotive lighting assembly 102 via the lighting controller 106 to emit light according to an emotive lighting sequence based on the state of a game conducted by the logic circuitry 40. The lighting controller 106 may include any suitable hardware and software to facilitate the functions of the lighting controller 106 and the lighting assembly 102 as described herein. For example, the lighting controller 106 may include one or more processors, memory devices, communication devices, power regulation circuitry, and/or other suitable components. In other embodiments, the lighting controller 106 may be integrated with the logic circuit 40 rather than a separate device. In such embodiments, the logic circuitry 40 may include dedicated hardware and/or software elements to operate as the lighting controller 106. For example, the logic circuitry 40 may include data and/or power wiring to couple to the light-emitting devices 108, 110 to transmit and receive emotive lighting data and power.

The light-emitting devices 108, 110 may be any suitable type or combinations of light-emitting devices. For example, the light-emitting devices 108, 110 may include, without limitation, light-emitting diodes (LEDs), organic LEDs, fluorescent devices, incandescent devices, arc devices, gas discharge devices, and the like. Each light-emitting device 108, 110 may include one or more light sources. For example, an LED-based light-emitting device may include several clustered LEDs to facilitate emitting multiple colors of light.

In the example embodiment, the differentiation between the surface light-emitting devices 108 and the indirect light-emitting devices 110 may be centered upon physical differences different orientations and positions) between the light-emitting devices 108, 110 or the different paths (and intermediate components) the emitted light takes from each set of lights. More specifically, in one example, the surface light-emitting devices 108 may be oriented to face a predetermined area associated with the gaming machine to facilitate direct observation of the emitted light while the indirect light-emitting devices 110 may be oriented away from the associated area, thereby requiring the use of at least one intermediate element to guide or direct light to the predetermined area. In another example, the light-emitting devices 108, 110 may have a similar orientation (e.g., facing away from a side or rear surface of the display device 104), but the path taken by the emitted light may be different. For example, the surface light-emitting devices 108 may be used in combination with a diffuser or waveguide having at least one surface exposed to or viewable from the predetermined area while the indirect light-emitting devices 110 may use a reflector 112 to direct light to the predetermined area as described herein.

It is to be understood that although the surface light-emitting devices 108 and/or the indirect light-emitting devices 110 may be directly observable from certain viewpoints of the gaming machine, the light-emitting devices 108, 110 may be configured to not be directly viewable in a predefined area or field of view (FOV) relative to the gaming machine. In certain embodiments, the emotive lighting assembly 102 may include light-emitting devices that function both as direct and indirect light sources. That is, a portion of the light emitted by such light-emitting devices may be directly viewable from the predetermined area, while another portion may be viewable through an intermediate element (e.g., the reflector 112).

As mentioned above, indirect lighting may have advantages to its inclusion in gaming machines. For example, the interaction between the emitted light and an intermediate surface or material, such as a textured, reflective surface, may result in a different emotive lighting effect relative to direct lighting (e.g., a rippling effect). As another example, indirect lighting may be beneficial for gaming machines with physical space limitations. That is, the gaming machine may be constrained to a limited floor space, or the gaming machine may be positioned adjacent to other gaming machines that may obscure light emitted from certain angles.

To direct the light from the indirect light-emitting devices 110 towards the player area, the presentation assembly 100 may include one or more reflectors 112. The reflector 112 may be part of the emotive lighting assembly 102 or a separate component, such as a component of the gaming machine cabinet. The reflector 112 is positioned and oriented relative to the indirect light-emitting devices 110 to receive emitted light and direct, via reflection, the emitted light towards the player area. The reflector 112 may be formed from any suitable material that reflects at least a portion of the emitted light from the indirect light-emitting devices 110. For example, and without limitation, the reflector 112 may be a metal (e.g., aluminum), plastic, a mirror, foils, films, a painted surface, and the like. In at least some embodiments, the reflector 112 may have a surface topography that facilitates controlled reflection of emitted light. That is, the reflector 112 may include surface elements that change the topography from a smooth surface to a textured surface, where the textured surface may result in an increase in the amount of reflected light in a particular direction. In the example embodiment and as described herein, the reflector 112 includes one or more convex surface elements 114 that extend toward the indirect light-emitting devices 110 relative the reflector 112. The convex surface elements 114 may be integrated with the reflector 112, or the surface elements 114 may be separate components mechanically coupled to the reflector 112 (e.g., via adhesive, physical couplings, welding, etc.). In other embodiments, the reflector 112 may include other suitable surface elements, including concave surface elements or surface elements that do not change the physical topography of the reflector 112, but rather change the reflective characteristics of the reflector 112 (e.g., painted or film surface elements).

In addition to the convex surface elements 114, the reflector 112 may be curved, angled, or otherwise positioned or oriented relative to the indirect light-emitting devices 110 to facilitate guiding the emitted light towards a predetermined area relative to the gaming machine (e.g., a player area associated with the gaming machine). The reflector 112 may at least partially define a light channel through which a substantial portion of the light emitted by the indirect light-emitting devices 110 travels outward from the gaming machine.

In the example embodiment, the presentation assembly 100 includes the display device 104. The emotive lighting assembly 102 may be configured to emit emotive lighting surrounding the display device 104 (and/or other display devices of the gaining machine). That is, in one example, the light-emitting devices 108, 110 may each include two, three, or four sets of light-emitting devices to border an edge of the display device 104. In another example, the surface light-emitting devices 108 may be positioned above and below the display device 104 while two reflectors 112 may be positioned adjacent the right and left edges of the display device 104 to reflect light from the indirect light-emitting devices 110. In such an example, the indirect light-emitting devices 110 may be positioned on the sides or back of the display device 104 (or a display assembly including the display device 104) and facing the respective reflector 112.

Figure 5:
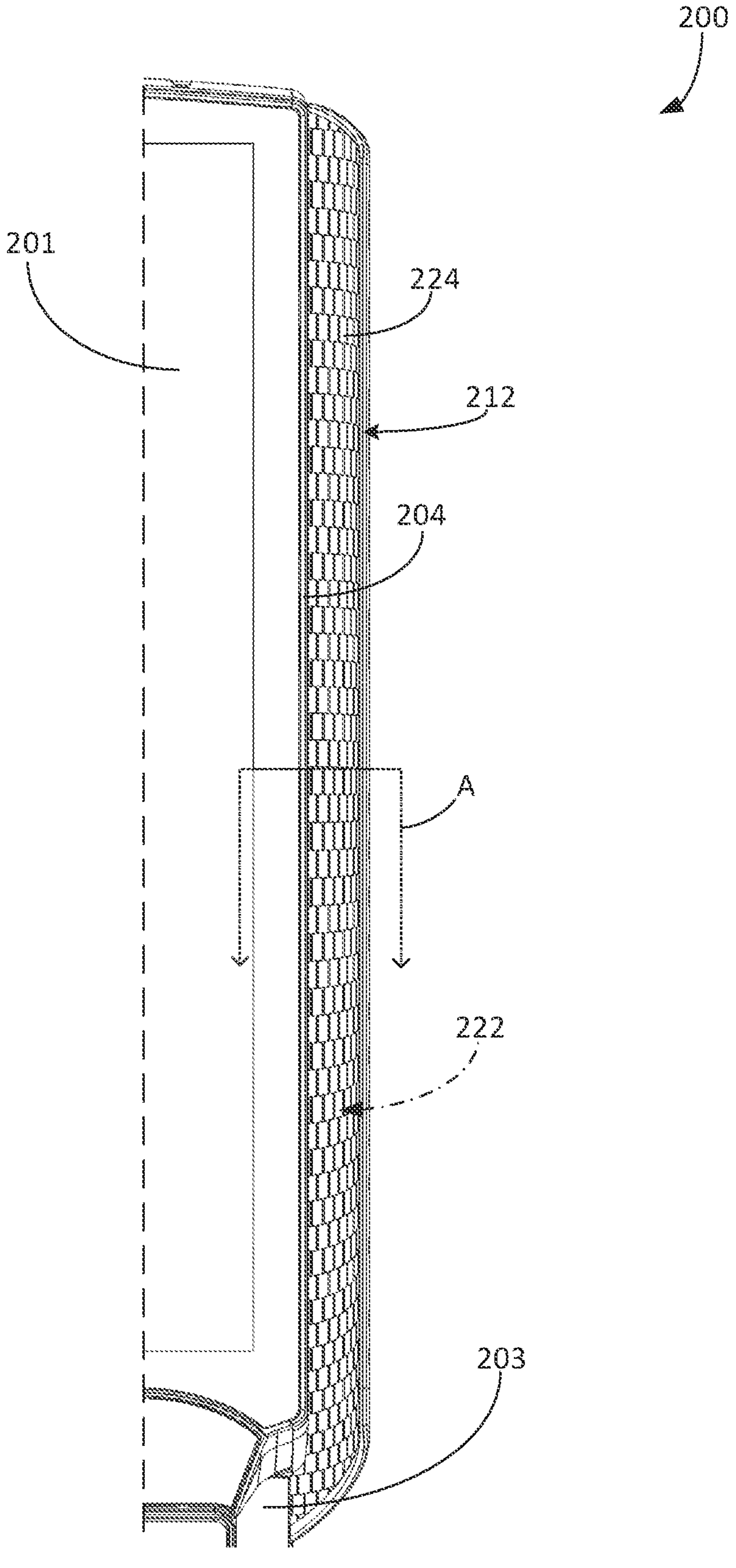
FIG. 5 is front view of an example emotive lighting assembly for a gaming machine, according to one or more embodiments of the present disclosure.
Figure 6:
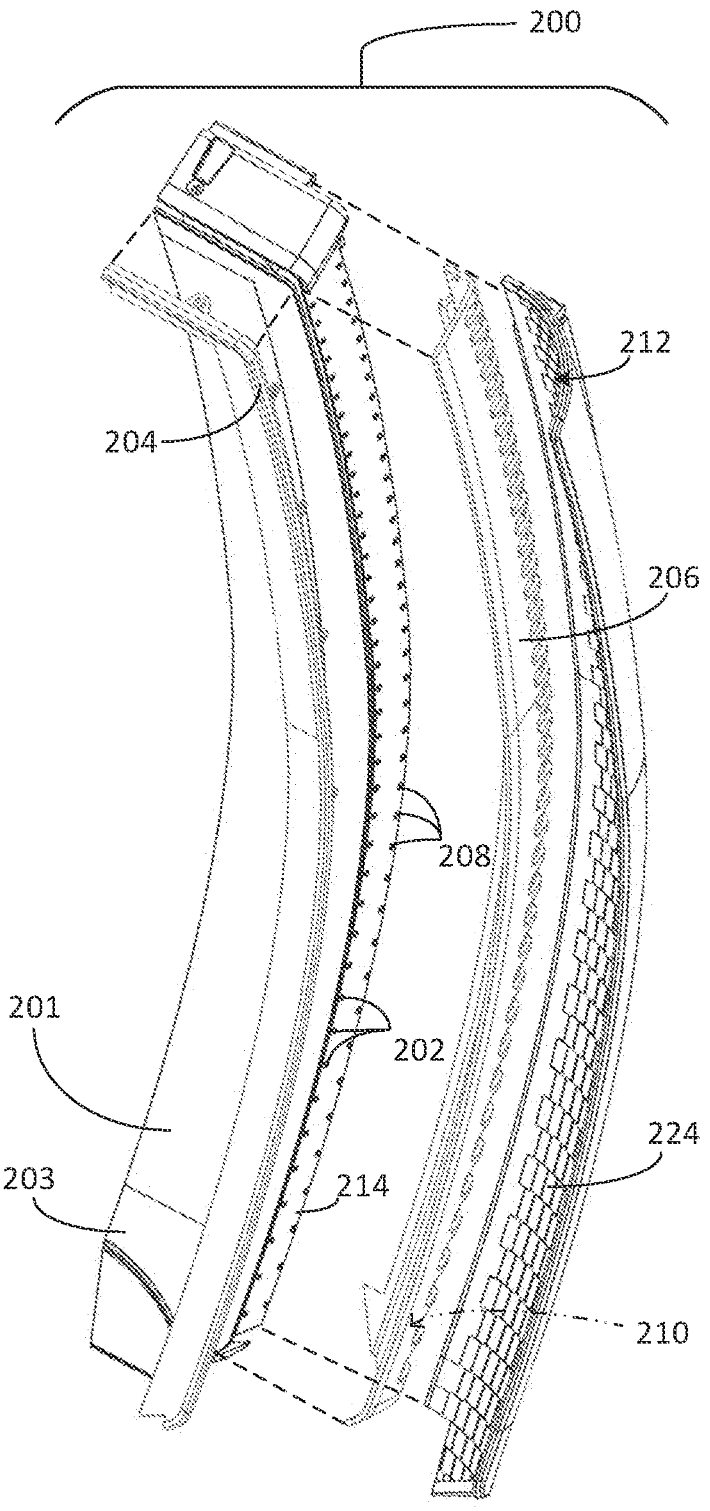
FIG. 6 is an exploded view of the emotive lighting assembly shown in FIG. 5, according to one or more embodiments of the present disclosure.
Figure 7:
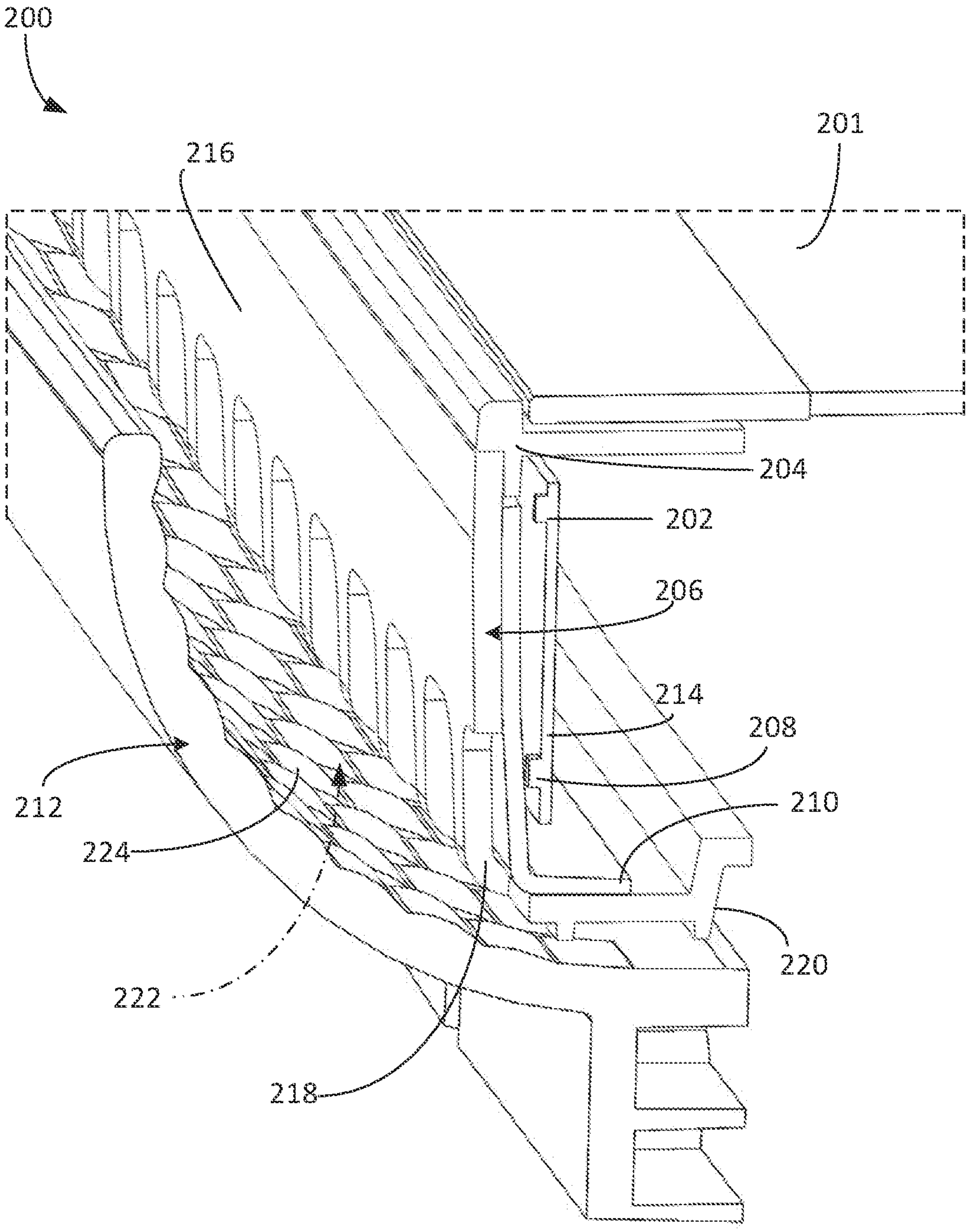
FIG. 7 is a perspective cross-sectional view of the emotive lighting assembly shown in FIG. 5, according to one or more embodiments of the present disclosure.
Figure 8:
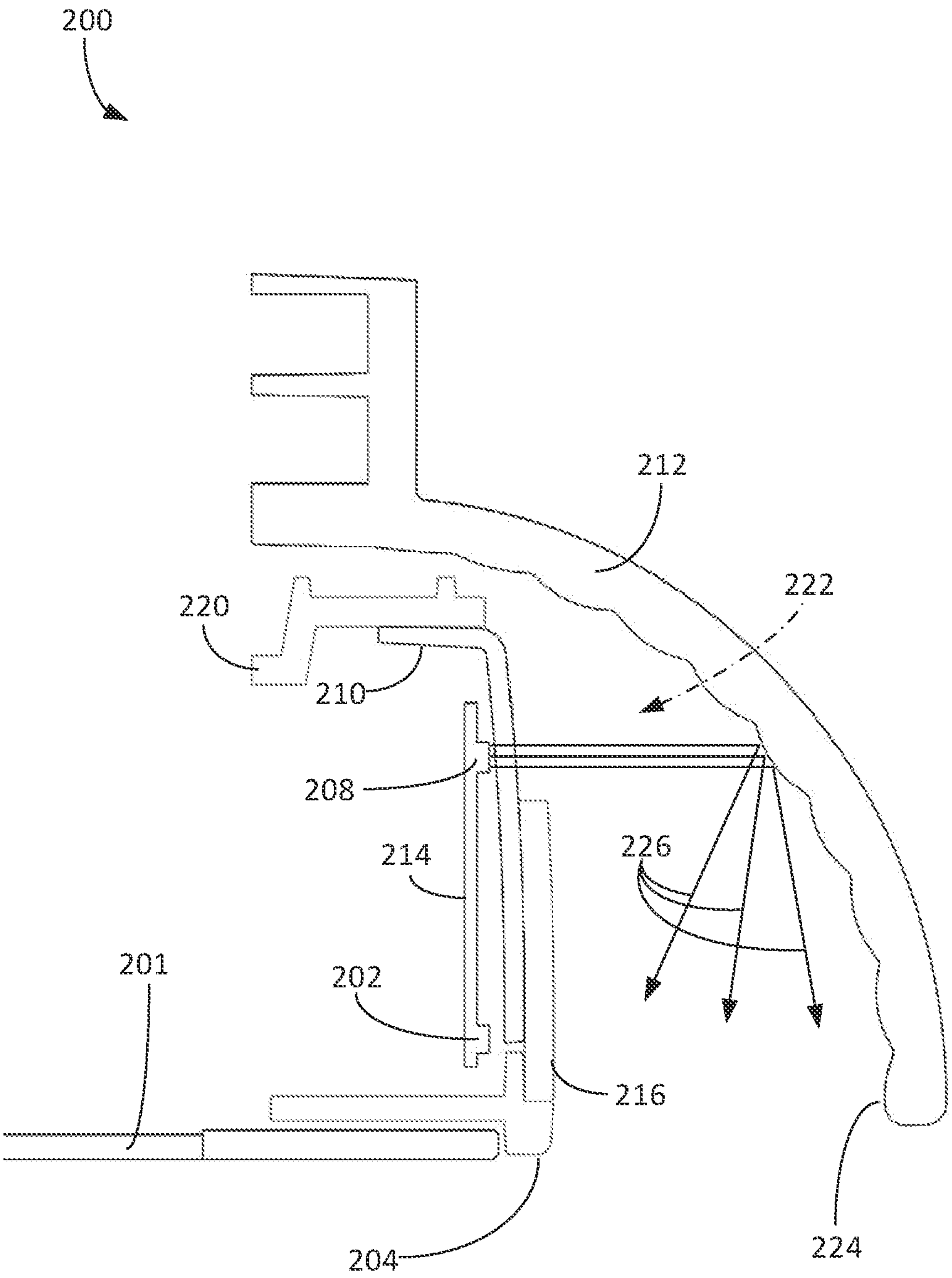
FIG. 8 is a top-down cross-sectional view of the emotive lighting assembly shown in FIG. 5, according to one or more embodiments of the present disclosure.

FIGS. 5-8 illustrate an example emotive lighting assembly 200 of a gaming machine (e.g., indicated by area A on the gaming machine 10 shown in FIG. 1), In particular, FIG. 5 is a front view of the emotive lighting assembly 200, FIG. 6 is an exploded view of the assembly 200, FIG. 7 is a perspective cross-sectional view (indicated by arrows 'A' in FIG. 5) of the assembly 200, and FIG. 8 a top-down cross-sectional view of the assembly 200. At least a portion of the surrounding components of the gaming machine may be removed in FIGS. 5-8 for clarity purposes. For example, at least portions of a cabinet 203 (shown in FIGS. 5 and 6) and the display device assembly of the gaming machine may be removed from FIGS. 7 and 8 in other embodiments, the emotive lighting assembly 200 may include additional, fewer, or alternative components in the same or other suitable configurations, including those described elsewhere herein.

In the example embodiment, the emotive lighting assembly 200 extends along and beyond a side of a display device 201. The emotive lighting assembly 200 may be at least partially integrated with the display device 201 (as part of a display or presentation assembly) and/or the cabinet 203 of the gaming machine. The emotive lighting assembly 200, the display device 201, and/or the cabinet 203 may be in a curved configuration. For example, as shown in FIGS. 1 and 6, the display device 201 has two curvatures along its vertical length: a gentle curvature (i.e., larger radius) from a top of the display device 201, and an increased or greater curvature (i.e., smaller radius) from a bottom of the display device 201. These two curvatures establish a gradient of curvature along the length of the display device 201. In the example embodiment, the emotive lighting assembly 200 and the cabinet 203 are configured to follow or accentuate the curvature of the display device 201. In other embodiments, another suitable curvature or set of curvatures (including no substantially curvature) may be used with the assembly 200, the display device 201, and/or the cabinet 203.

In the example embodiment, the emotive lighting assembly 200 includes surface light-emitting devices 202, a diffuser 204, a support member 206, indirect light-emitting devices 208, a protecting member 210, and a reflector 212. It is to be understood that at least some embodiments include a plurality of emotive lighting assemblies or separate portions of the lighting assembly 200. That is, the gaming machine may include additional emotive lighting assemblies in the same configuration as the assembly 200 or another suitable configuration. For example, if the assembly 200 is positioned adjacent to the side of the display device 201, the gaming machine may include another identical (mirrored) emotive lighting assembly longitudinally opposite the assembly 200 relative to the display device 201 such that the display device 201 is positioned between the emotive lighting assemblies.

In the example embodiment, the surface light-emitting devices 202 and the indirect light-emitting devices 208 are LEDs disposed on a shared printed circuit board (PCB) 214 or other suitable substrate component. More specifically, the light-emitting devices 202, 208 are arranged into two parallel curvilinear lines that extend along a vertical length of the cabinet and facing the same direction (i.e., away from a side of the display device 201). In other embodiments, the light-emitting devices 202, 208 may be arranged in a different suitable configuration, such as offset lines, a plurality of lines, and the like based on the physical specifications of the gaming machine, the physical, thermal, and/or electrical characteristics of the light-emitting devices 202, 208, and/or the emotive lighting desired. The light-emitting devices 202, 208 may be electrically and/or communicatively coupled or isolated from each other. Although the two sets of light-emitting devices 202, 208 may share the PCB 214, as described herein, the path of the light and the intermediate components along the path of light from the light-emitting devices 202, 208 result in different appearances to the emotive light as observed externally.

In some embodiments, the light-emitting devices 202, 208 may be coupled to the gaming machine in a different orientation relative to the display device 201 or the cabinet 203, such as facing away from a back side of the display device 201. In other embodiments, the surface light-emitting devices 202 may not be physically connected to the indirect light-emitting devices 208, but rather are on separate PCBs or substrates. In such embodiments, the surface light-emitting devices 202 may have a different orientation in relation to the indirect light-emitting devices 208. For example, the surface light-emitting devices 202 may face an area in front of the gaming machine and the display device 201 while the indirect light-emitting devices 208 face a side of the gaming machine and the display device 201. In certain embodiments, the assembly 200 may include a single light-emitting device or single set of light-emitting devices that function both as the surface light-emitting devices 202 and the indirect light-emitting devices as described herein. That is, a portion of the light from the light-emitting devices in these embodiments may be observed in the same or similar manner to the observable light from the surface light-emitting devices 202 described herein and another portion of the light may be observed in the same or similar manner to the Observable light from the indirect light-emitting devices 208.

In the example embodiment, the assembly 200 is configured to facilitate at least a substantial portion of the light emitted from the surface light-emitting device 202 being observable from a predetermined area associated with the gaming machine. More specifically, in at least this embodiment, the predetermined area is an area in front of the gaming machine, including a player area where a player is expected to be located. In other embodiments, the predetermined external area may be a different suitable area from which emotive lighting of the gaming machine may be observed. To aid the transfer of the emitted light in the predetermined direction, the diffuser 204 is positioned adjacent to the surface light-emitting devices 202, and the support member 206 is coupled adjacent to the surface light-emitting devices 202. The diffuser 204 is formed from a material (or combinations of materials) having light-scatting characteristics such that light directed at the diffuser 204 may pass through or scatter from the diffuser 204 at a variety of angles of incidence. This scattering causes emitted light from a point light source (such as an LED) to appear spread out over at least a portion of the diffuser 204 rather than as a concentrated area of light. In other words, rather than seeing the light sources themselves through the diffuser 204, the diffuser 204 itself may appear to be illuminated. The light scattering capabilities and appearance of the light through the diffuser 204 may be configurable through using different diffusive materials, different suitable machining processes, filters, and/or other production aspect to form the diffuser 204. In one example, the diffuser 204 may be formed from a polycarbonate material. At least some benefits to the use of diffusers may include a reduced number of light-emitting devices to light a surface of the gaming machine, lighting may appear to transition seamlessly between two adjacent light-emitting devices such that the diffuser 204 may appear to be filled with continuous light (when all or most light-emitting devices are active), and/or the diffuser may scatter light in directions other than the direction in which the light-emitting device is facing.

In the example embodiment, the diffuser 204 includes at least one surface observable from the predetermined area and at least one surface positioned adjacent to the surface light-emitting devices 202 to receive light. Light emitted by the surface light-emitting devices 202 may be scattered by the diffuser 204, thereby causing the observable surface to appear illuminated to an observer in the predetermined area. To keep the emotive lighting from the surface light-emitting devices 202 and the indirect light-emitting devices 208 separate and to increase the amount of light received by the diffuser 204 from the surface light-emitting devices 202, the support member 206 is formed from a solid opaque material (e.g., a plastic or metal material) such that light from the surface light-emitting devices 202 does not pass directly to the reflector 212. In addition to a solid upper body 216 positioned over the surface light-emitting devices 202, the support member 206 includes a plurality of fingers 218 (fingers 218 are not shown in FIG. 8 for clarity purposes) that extend down over the area including the indirect light-emitting devices 208. The fingers 218 define a plurality of gaps that are aligned with each indirect light-emitting device 208 to enable emitted light to pass through to the reflector 212. The fingers 218 may terminate in a solid lower body 220 to provide structural support to the lighting assembly 200 and the cabinet 203.

In the example embodiment, the indirect light-emitting devices 208 are positioned behind the surface light-emitting devices 202 relative to the front the gaming machine. In other embodiments, the indirect light-emitting devices 208 may have a different positional relationship to the surface light-emitting devices 202 and/or other components in the emotive lighting assembly 200. The indirect light-emitting devices 208 are positioned and oriented to not be directly observable from the predetermined area associated with the gaming machine (e.g., in front of the gaming machine). In the illustrated example, the display device 201, the cabinet 203, and the reflector 212 may obscure the indirect light-emitting devices 208 from direct viewing. The indirect light-emitting devices 208 may be individually controllable and controlled separately or together with the surface light-emitting devices 202.

In the example embodiment, the protecting member 210 is coupled to the support member 206 and houses at least the indirect light-emitting devices 208. The protecting member 210 may be configured to enclose the indirect light-emitting devices 208 and/or to act as a light diffuser similar to the diffuser 204. The material or combination of materials of the diffuser 204 may be selected to enable light to pass through the diffuser 204 and the gaps between the fingers 218 to reach the reflector 212. For example, the diffuser 204 may be a transparent or translucent material (e.g., polycarbonate, glass, acrylic, etc.) that facilitates passage of light and/or light scattering. In some embodiments, the protecting member 210 and the support member 206 may be integrated with each other rather than separate components. For example, the gaps between the fingers 218 may be covered by an integrated protecting member 210 or a plurality of respective protecting members 210. In certain embodiments, the assembly 200 may not include either the support member 206 or the protecting member 210 such that the remaining component functions as both the support member 206 and the protecting member 210 described above.

The light emitted by the indirect light-emitting devices 208 through the protecting member 210 may be received by the reflector 212. In the example embodiment, the reflector 212 is positioned and configured to facilitate reflecting at least a portion of light emitted by the indirect light-emitting devices 208 towards the predetermined or predefined area relative to the gaming machine (e.g., the player area in front of the gaming machine). In this example, the reflector 212 extends from behind the display device 201 towards the player area in a curved configuration. The reflector 212 may be coupled to a back of the gaming machine cabinet 203. In other embodiments, the reflector 212 may be integrated with the cabinet 203. At least a portion of the reflector 212 may extend near a side of the display device 201, though the reflector 212 may also include any suitable curvature for the gaming machine (e.g., the reflector 212 may extend below or above the display device and curve inwards, or the reflector 212 may be curved to follow the curve of the display device).

The curved reflector 212 is spaced from the display device 201 (and its corresponding support elements) and the indirect light-emitting devices 208 to at least partially define a light channel 222. As indicated by arrows 226 shown in FIG. 8, light emitted by the indirect light-emitting devices 208 towards the reflector 212 travels through the light channel 222 and reflects off the reflector 212 out of the light channel 222 at a variety of angles of incidence. As used herein, the surface or surfaces of the reflector 212 that receive the emitted light from the indirect light-emitting devices 208 may be referred to herein as a "reflective surface." In the example embodiment, the light is reflected out towards in front of the gaming machine. To an observer in front of the gaming machine, this reflected light may cause the reflector 212 to appear as illuminated. It is to be understood that although the arrows 226 indicate a general direction of the light, a portion of the light from the indirect light-emitting devices 208 may travel a different direction or path within and out of the light channel 222.

In at least some embodiments, the diffuser 204, the support member 206, the protecting member 210, the reflector 212, and/or the PCB 214 may extend along a length of the cabinet 203. These components each may be a singular component, or the component may be subdivided into a plurality of subcomponents. For example, the PCB 214 may be divided into a plurality of interconnected PCBs 214, or the reflector 212 may be divided into sections along the length of the cabinet 203 that are mechanically coupled together or adjacent to each other to form a continuous or substantially continuous reflector 212.

In addition to the curvature of the reflector 212, the reflector 212 may include surface elements that facilitate increased light propagation and/or different lighting effects (e.g., the light appears rippled or textured when observed). In the example embodiment, the reflector 212 includes a plurality of convex surface elements 224. The convex surface elements 224 are semi-cylindrical in shape and extend outwards from the surface of the reflector 212 in a series of offset rows. In other embodiments, other suitable configurations of surface elements 224 may be incorporated in the reflector 212, including the examples described herein with respect to FIG. 9 and/or concave surface elements.

The use of convex surface elements 224 in comparison to other surface elements (e.g., a flat reflector surface) may result in the light being reflected out of the light channel 222 across a wider field of view. That is, some alternative surface elements may focus the light from the indirect light-emitting devices within a narrow field of view. This may result in the light being observable within a narrower area in front of the gaming machine and/or the light appearing to be focused at particular points on the reflector 212 to an observer in front of the gaming machine, leaving the remaining surface area of the reflector 212 to appear dimly lit or not lit at all. In contrast, the curvature of the convex surface elements 224 create a variety of angles of incidence across the surface of each surface element 224 that, when combined with the curved orientation and position of the reflector 212 from which the surface elements 224 extend, cause the light from the indirect light-emitting devices 208 to reflect out a relatively wider area from the light channel 22. To an observer in front of the gaming machine, the reflected light in the example embodiment may be observable at a variety of angles relative to the gaming machine and the reflector 212 may appear to appear more evenly illuminated and voluminous. The specific configuration of convex surface elements 224 may result in a textured appearance to the observable light (i.e., the light is not uniform in its appearance and includes shadows and/or light gradients).

In at least some embodiments, the convex surface elements 224 may be integrated with the reflector 212 such that the surface elements 224 are machined or otherwise formed within the reflector 212. In one example, the reflector 212 and the integrated surface elements 224 are formed from aluminum. In other embodiments, the surface elements 224 may be applied or coupled to the reflector 212. For example, the reflector 212 may include one or more features (e.g., fastener points, grooves, clips, etc.) for securing the surface elements 224. In another example, the surface elements 224 or the reflective surface as a whole may be applied to the reflector 212. That is, the surface elements 224 and/or the reflective surface may be a paint, foil, film, and/or other suitable application materials applied to the reflector 212. The materials and configuration of the reflector 212 and the surface elements 224 may include any suitable material and/or configuration that facilitates the reflection of light described above and herein. In certain embodiments, the convex surface elements 224 may have a textured surface rather than a substantially smooth surface.

The observable light from the indirect light-emitting devices 208 may be configurable at least partially as a function of: (i) the relative position of the indirect light-emitting devices 208, the reflector 212, and the convex surface elements 224; (ii) the orientation of the indirect light-emitting devices 208; (iii) the curvature of the reflector 212; and (iv) the configuration of the convex surface elements 224. That is, the same or similar resulting observable light may be achievable from a variety of combinations of these variables. Other variables may also affect the resulting light, such as the transparency of the second protecting member 210 and/or the position of the second protecting member 210. In some embodiments, at least one element of the emotive lighting assembly 200 may be configuration to articulate or otherwise move. For example, the indirect light-emitting devices 208 and/or the reflector 212 may be configurable to move dynamically, thereby resulting in varied observable light for emotive lighting sequences and/or resulting in varied physical configurations of the gaming machine.

As can be seen from FIG. 1, the emotive lighting assembly 200 may include additional sections or subassemblies to present emotive lighting for the gaming machine. For example, the emotive lighting assembly 200 may extend along a side of the display device (or a side of the cabinet) and may include one or more additional subassemblies similar to the assembly 200 shown in FIGS. 5-8 that border another edge or side of the display device (or gaming machine cabinet), In such an example (and as shown in FIG. 1), an opposing subassembly to the subassembly shown in FIGS. 5-8 having the same or similar configuration may be located on the opposing side of the display device. As a result, each component of the assembly 200 may have an identical opposing component longitudinally opposed the component relative to the display device (i.e., the middle of the display device defines a vertical axis, and opposing component is mirrored across the vertical axis). In certain embodiments, the assembly 200 may be continuous around at least two edges of the display device or be divided into adjacent subassemblies.

Figure 9:
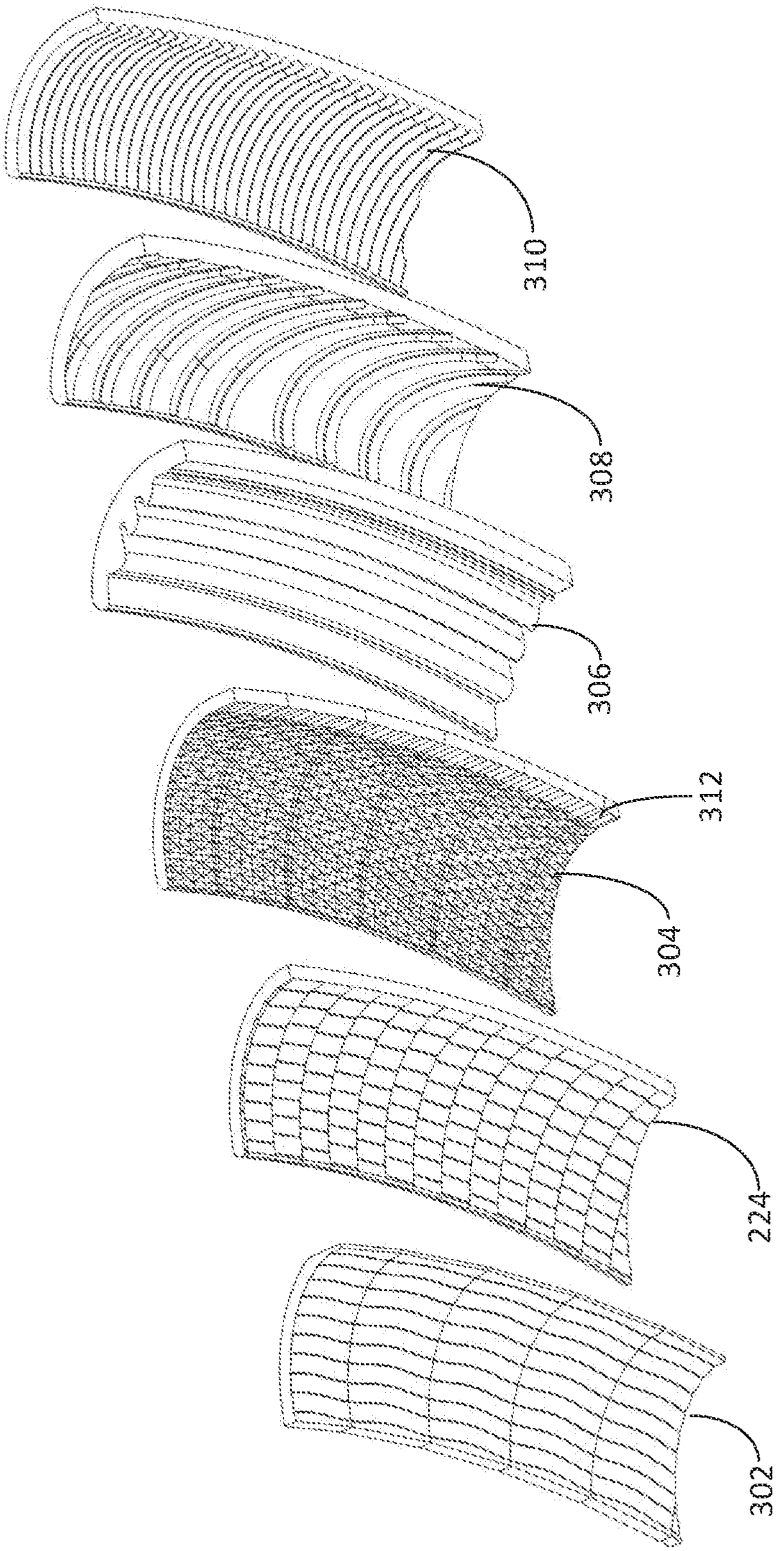
FIG. 9 is a perspective view of a plurality of example reflectors having different convex surface elements, according to one or more embodiments of the present disclosure.

FIG. 9 depicts a plurality of different example configurations of surface elements that may be used for the reflector 212. Each surface element configuration in FIG. 9 include convex surface elements. More specifically, FIG. 9 includes the surface elements 224 shown in FIGS. 5-8, waved surface elements 302, diamond surface elements 304, fin surface elements 306, curved surface elements 308, and ribbed surface elements 310. Each configuration may result in a different appearance in the resulting observable light. It is to be understood that the configurations shown are for exemplary purposes only and are not intended to limit the embodiments described to those shown in FIG. 9. For example, the reflector 212 may include discrete semi-circular surface elements rather than diamond surface elements 304.

The waved surface elements 302 are convex bumps formed in the reflector 212 and extend along the vertical length of the reflector in a wavy pattern. Unlike the convex surface elements 224, the waved surface elements 302 do not have an offset between rows of surface elements, but rather are joined to form continuous columns. In some embodiments, each column is formed by a single surface element 302.

In the example embodiment, the diamond surface elements 304 have a pyramid shape (i.e., four triangular faces extending into a single apex). Each surface element 304 is arranged such that each edge of the surface element 304 is shared with another adjacent surface element 304 such that the diamond surface elements 304 appear to be arranged in offset rows. In other embodiments, the diamond surface elements 304 may have a different configuration. For example, the diamond surface elements 304 may be spaced apart from each other, or the surface elements 304 may have a conical shape rather than pyramid shape.

In at least some embodiments, the reflector 212 may include a plurality of surface element configurations. For example, in addition to the diamond surface elements 304, the reflector 212 may include border surface elements 312. The border surface elements 312 may be convex elements adjacent to the diamond surface elements 304 that extend perpendicular to the vertical length of the reflector 212. The use of different surface element configurations may create different textures to the observable light from the reflector 212.

In some embodiments, combinations of surface elements may have a similar configuration rather than distinctly different configurations like the diamond surface elements 304 and the border surface elements 308, but instead have varying shapes and/or sizes for each surface element. The fin surface elements 306 have similar leading edges (rounded arc or fin), but extend out at different distances from the reflector 212 and are of different sizes. More specifically, the length and size of each fin surface element 306 decreases the further away the fin surface element 306 is from the indirect light-emitting devices 208 (and the closer to the front of the gaming machine the fin surface element 306 is).

As mentioned above, in some embodiments, the emotive lighting assembly 200 may include concave surface elements in addition to or in place of convex surface elements. The use of concave surface elements may result in different lighting effects because the angles of incidence formed by convex and concave surface elements are different. For example, the concave surface elements may focus light within a relatively narrower field of view, but at an increased observable brightness relative to the convex surface elements. In some embodiments, the concave surface elements may be incorporated with the convex surface elements to provide a mixture of lighting effects. For example, the surface elements may alternate between convex and concave in a pattern extending along the reflective surface. It is to be understood that although the systems described above refer primarily to convex surface elements, concave surface elements may be incorporated into the emotive lighting assembly 200 similar to the convex surface elements.

Figure 10:
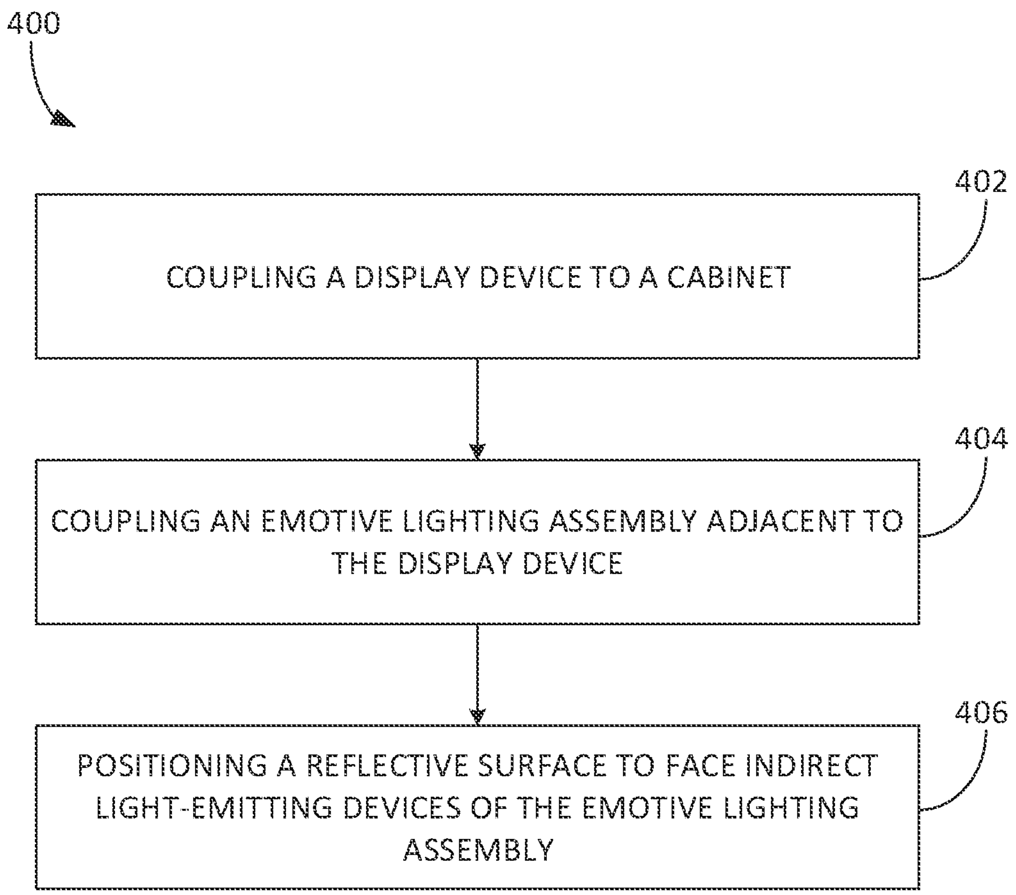
FIG. 10 is a flow diagram of an example method of assembly of a gaming machine, according to one or more embodiments of the present disclosure.

FIG. 10 is a flow diagram of an example method 400 for assembling a gaming machine including an emotive lighting assembly, such as the emotive lighting assembly 200 shown in FIGS. 5-8. The method 400 may include additional, fewer, or alternative steps to the steps described in relation to FIG. 10, including those described elsewhere herein.

At step 402, a display device is coupled to a cabinet of the gaming machine. The display device may be coupled 402 to the cabinet via one or more display supports, such as a display harness affixed to the display device that includes one or more features or components (e.g., fasteners, grooves, etc.) for physically coupling to the cabinet.

At step 404, an emotive lighting assembly including at least light-emitting device is coupled adjacent to the display device. The lighting assembly may be coupled to the display device, a support for the display device, the cabinet, and/or any other suitable structural component of the gaming machine. In some embodiments, the lighting assembly is coupled to the display device (or is corresponding supports) prior to the display being coupled 402 to the cabinet such that the lighting assembly and the display device form a singular presentation assembly. In other embodiments, the lighting assembly may be coupled to the cabinet near the coupled position of the display device. The lighting assembly includes at least one light-emitting device that may not be viewable from a predefined area relative to the gaming machine. In the example embodiment, the predefined area is an area in front of the gaming machine, which includes a player area from which a player interacts with the gaming machine for play of one or more games.

At step 406, a reflective surface or reflector of the cabinet is positioned to face the indirect light-emitting device. In some embodiments, the reflector is a component that is coupled to the cabinet. In other embodiments, the reflector or reflective surface is integrated with the cabinet such that the positioning of the reflective surface is predefined at the time of assembly of the gaming machine. The reflective surface includes at least one convex surface element extending towards the indirect light-emitting device such that, when light is emitted by the indirect light-emitting device, the convex surface elements are configured to reflect at least a portion of the light towards the predefined area. In at least some embodiments, the reflective surface may include at least one concave surface element facing the indirect light-emitting device. The concave surface elements may be raised from the reflective surface (i.e., the walls defining the concave surface elements extend from the reflective surface) or may be sunk or integrated with the reflective surface.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects. It is to be understood that emotive lighting of the foregoing systems and methods are not limited to the exemplary gaming machines described above. That is, other gaming systems, such as gaming tables, bar top gaming machines, kiosk terminals, and the like, may incorporate the same or similar emotive lighting configurations.

The invention claimed is:

1. A presentation assembly for a gaming machine, the presentation assembly comprising:
- a display device;
- at least one light-emitting device positioned adjacent the display device; and
- a reflective surface facing the at least one light-emitting device and extending toward a predetermined area associated with the gaming machine to define a light channel at least partially, between the reflective surface and the display device, the reflective surface including a plurality, of concave surface elements configured to reflect at least a portion of light emitted by the at least one light-emitting device towards the predetermined area.

2. The presentation assembly of claim 1, wherein the at least one light-emitting device is oriented to face outward relative to a side surface or a rear surface of the display device.

3. The presentation assembly of claim 1 further comprising a plurality of light-emitting devices including the at least one light-emitting device and at least one surface light-emitting device, the at least one surface light-emitting device positioned adjacent the display device and configured to emit light towards the predetermined area.

4. The presentation assembly of claim 1, wherein the reflective surface is curved to define the light channel.

5. The presentation assembly of claim 1, wherein each element of the plurality of concave surface elements has a semi-cylindrical shape within the reflective surface.

6. The presentation assembly of claim 1 further comprising a second reflective surface longitudinally opposed from the reflective surface relative to the display device and at least one additional light-emitting device adjacent to the display device and longitudinally opposed to the at least light-emitting device relative to the display device, wherein the second reflective surface is oriented to face the at least one additional light-emitting device.

7. The presentation assembly of claim 1, wherein the predetermined area includes a player area in front of the display device.

8. A gaming machine comprising:

a cabinet;

a display device coupled to the cabinet;

a lighting assembly comprising at least one light-emitting device positioned adjacent the display device; and a reflective surface facing the at least one light-emitting device and extending toward a predetermined area associated with the gaming machine to define a light channel at least partially between the reflective surface and the display device, the reflective surface including a plurality of concave surface elements configured to reflect at least a portion of light emitted by the at least one light-emitting device towards the predetermined area.

9. The gaming machine of claim 8, wherein the at least one light-emitting device is oriented to face outward relative to a side surface or a rear surface of the display device.

10. The gaming machine of claim 8, wherein the lighting assembly further comprises a plurality of light-emitting devices including the at least one light-emitting device and at least one surface light-emitting device, the at least one surface light-emitting device positioned adjacent the display device and configured to emit light towards the predetermined area.

11. The gaming machine of claim 10, wherein the lighting assembly includes a diffuser having at least one surface observable from the predetermined area and positioned to receive emitted light from the at least one surface light-emitting device, the received light observable through the at least one surface of the diffuser.

12. The gaming machine of claim 10, wherein the lighting assembly includes a lighting substrate coupled to the at least one light-emitting device and the at least one surface light-emitting device, the at least one light-emitting device and the at least one surface light-emitting device oriented to face the same direction.

13. The gaming machine of claim 8, wherein the reflective surface is curved to define the light channel.

14. The gaming machine of claim 8, wherein the predetermined area includes a player area in front of the display device.

15. An emotive lighting assembly for a gaming machine, the emotive lighting assembly comprising:

at least one surface light-emitting device oriented to emit light towards a predetermined area associated with the gaming machine;

at least one indirect light-emitting device positioned behind the at least one surface light-emitting device relative to the predetermined area; and a reflective surface oriented to face the at least one indirect light-emitting device and to extend toward the predetermined area to define a light channel at least partially between the reflective surface and the at least one indirect light-emitting device, the reflective surface including a plurality of concave surface elements configured to reflect at least a portion of light emitted by, the at least one light-emitting device towards the predetermined area.

16. The emotive lighting assembly of claim 15, wherein the at least one indirect light-emitting device is oriented to face outward relative to a side surface or a rear surface of the display device.

17. The emotive lighting assembly of claim 15 further comprising a lighting substrate coupled to the at least one indirect light-emitting device and the at least one surface light-emitting device, the at least one indirect light-emitting device and the at least one surface light-emitting device oriented to face the same direction.

18. The emotive lighting assembly of claim 15 further comprising a diffuser having at least one surface observable from the predetermined area and positioned to receive emitted light from the at least one surface light-emitting device, the received light observable through the at least one surface of the diffuser.

19. The emotive lighting assembly of claim 15, wherein the reflective surface is curved towards the predetermined area to define the light channel.

20. The emotive lighting assembly of claim 15, wherein the predetermined area includes a player area in front of the gaming machine.

* * * * *